United States Patent
Kotsis et al.

(10) Patent No.: US 6,996,554 B2
(45) Date of Patent: Feb. 7, 2006

(54) DATABASE PROCESSOR (75) Inventors: Nikolaos Kotsis, Glasgow (GB); Douglas Robert MacGregor, Glasgow (GB)

(73) Assignee: University of Strathclyde, Glasgow (GB)

( * ) Notice: Subject to any disclaimer, the term of this patent is extended or adjusted under 35 U.S.C. 154(b) by 388 days.

(21) Appl. No.: 10/121,502

(22) Filed: Apr. 12, 2002

(65) Prior Publication Data

US 2003/0004959 A1   Jan. 2, 2003

Related U.S. Application Data (63) Continuation of application No. PCT/GB00/03963, filed on Oct. 16, 2000.

(30) Foreign Application Priority Data

Oct. 15, 1999   (GB) .................................. 9924523

(51) Int. Cl.
*G06F 17/30*   (2006.01)
*G06F 7/00*    (2006.01)

(52) U.S. Cl. ................................. 707/2; 707/4; 707/10
(58) Field of Classification Search ................... 707/2, 707/4, 10
See application file for complete search history.

(56) References Cited

U.S. PATENT DOCUMENTS 5,832,475 A * 11/1998 Agrawal et al. ............... 707/2
6,480,842 B1 * 11/2002 Agassi et al. .................. 707/4

* cited by examiner

*Primary Examiner*—Mohammad Ali
*Assistant Examiner*—Thanh-Ha Dang
(74) *Attorney, Agent, or Firm*—Alston & Bird LLP (57) ABSTRACT

A database processor is provided for on-line analytical processing. The processor is arranged to obtain multi-dimensional aggregates of an input relation. Prior to aggregation, the processor performs a pre-processing stage in which the processor identifies Group-bys that are equivalent to the root relation and thus can be derived directly from the root relation without computation. In this manner, the computational time and storage of the multidimensional aggregates is reduced since only unique Group-bys in the lattice are computed and stored.

9 Claims, 8 Drawing Sheets

| A | B | C | Z |
|---|---|---|---|
| A1 | B1 | C1 | 80 |
| A2 | B3 | C4 | 20 |
| A1 | B2 | C3 | 50 |
| A1 | B1 | C1 | 30 |
| A3 | B1 | C3 | 80 |
| A2 | B3 | C2 | 100 |
| A1 | B1 | C1 | 45 |
| A3 | B2 | C3 | 70 |
| A2 | B1 | C2 | 30 |

Rc

| A | B | $Z\alpha$ |
|---|---|---|
| A2 | B3 | 120 |
| A1 | B1 | 155 |
| A3 | B1 | 80 |
| A1 | B2 | 50 |
| A3 | B2 | 70 |
| A2 | B1 | 30 |

DATABASE PROCESSOR

CROSS-REFERENCE TO RELATED APPLICATIONS

This application is a Continuation of International Application PCT/GB00/03963 filed on Oct. 16, 2000, which designated the U.S. and was published under PCT Article 21(2) in English, and which is hereby incorporated herein in its entirety by reference.

BACKGROUND OF THE INVENTION

This invention relates to an improved database processor and system architecture.

1. Field of the Invention

Relational database management systems (DBMSs) are used throughout organisations for maintaining data that changes on a daily basis recording individual transactions as they occur. These databases are called operational databases and their data processing applications are known as On-Line Transaction Processing (OLTP) applications. DBMSs have been able to perform these functions satisfactorily for some years.

2. Description of Related Art

Increasingly organizations utilize data processing applications which allow them to compare current and past data, enabling them to highlight trends and thus support decision making. In order that the decision support system is effective, many organizations create consolidated data warehouses which collect the data from several heterogeneous operational databases or other information sources and integrate them for retrieval of historical and summary information. This is known as On-Line Analytical Processing (OLAP) and the computations required are complex, involve large volumes of data and typically involve data aggregation.

The functional and performance requirements of OLAP are quite different from those of the OLTP data processing applications traditionally supported by the operational databases.

OLTP applications typically automate clerical data processing tasks such as order entry and banking transactions that are the day-to-day operations of an organisation. These tasks are structured, repetitive and consist of short, atomic isolated transactions which require detailed, up-to-date data, and read or update, a few (tens of) records accessed typically on their primary keys. Operational databases tend to be hundreds of megabytes to gigabytes in size.

OLAP applications in contrast, are targeted for decision support. Historical summarised and consolidated data is more important than detailed, individual records. Since data warehouses typically contain consolidated data from several databases, potentially over long periods of time (for example as indicated in Table I), they tend to be orders of magnitude larger than the operational databases. The workloads are query intensive with mostly ad-hoc, complex queries that can access millions of records.

Most database management systems to-day are based on the relational data model. The central data description construct in this model is a relation which is a set of records, each of which has the same number (and type) of fields. A database is a collection of one or more relations and includes a schema—a description of the data. In the relational model, the schema for a relation specifies its name, the name of each field (or attribute or column) and the domain (type) of each field. For example, a relation called Product may have the following schema: Product(Product_ID:string, Type:string, Day:string, Month:integer, Year:integer), which denotes that each row in the relation has four fields, with field names and types as indicated. An example instance of the Product relation would be:

| Product_ID | Type | Production_Year |
|---|---|---|
| P1 | Shampoo | 1997 |
| P2 | Soap | 1998 |
| P3 | Conditioner | 1998 |

Relational systems allow a wide variety of queries to be posed easily. An example of the type of query the relational system enables are user to find is:

Find the products which have been produced in 1998

The most widely used commercial relational database language is the Structured Query Language (SQL). The above query can be posed to the database through ANSI/ISO SQL-92 in the following form:

SELECT P.Product_ID, P.Type, P.Day, P.Month, P.Year
FROM Product
WHERE P.Year=1998

The abbreviation of P stands for the full relation name (Product).

The result relation of the above query is:

| Product_ID | Type | Production_Year |
|---|---|---|
| P2 | Soap | 1998 |
| P3 | Conditioner | 1998 |

For OLAP applications a recently proposed multidimensional conceptual model may be used in preference to the tabular model (Table I) of the relational system. Data are represented to the users as a multidimensional Cube. The multidimensional model can be associated with the Sales relation shown in Table I. Each domain is classified either as a Dimension or a Measure of Interest. In this example, the measure of interest is Total_Sales and the dimensions are PRODUCT_ID, STORE, MONTH.

The fundamental operation in OLAP applications is aggregating a measure over one or more dimensions.

Figure 1:
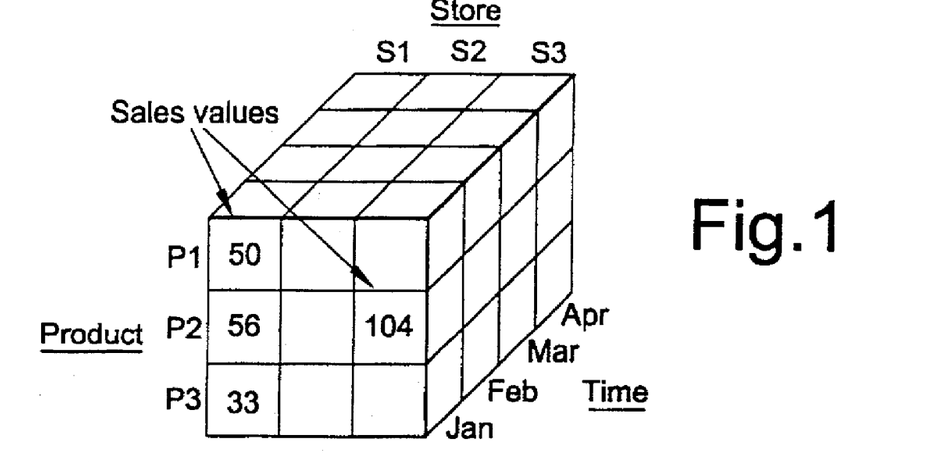
FIG. 1 illustrates a multi-dimensional cube.

In the cube those domains considered as dimensions are placed on the sides of the cube and the measure of interest (Total_Sales) is the content of each cell of the multidimensional array as shown in FIG. 1.

The cube data model introduced new conceptual operations. The user can 'rollup' the cube to obtain a less detailed more abstract view of the data. In the opposite process the user can 'drill-down' expanding the representation from the total to a further level of detail. 'Slice' amounts to equality selection and 'dice' amounts to a range selection. 'Rotate' is when the view is rotated 90 degrees clockwise without any rearrangement of the data.

A dimension may be associated with a hierarchy. For example the TIME dimension could have the following hierarchy:

YEAR ------> QUARTER --------> MONTH --------> DAY

The multidimensional operations can utilize such hierarchies, e.g., Rollup of a TIME dimension can be done to each of the above levels as required by the user.

Aggregation which is the fundamental operation in OLAP transactions is classified into Scalar aggregates and aggregate functions. Scalar aggregates calculate a single scalar value from a unary-input relation, e.g., the max value of an attribute in a relation. An aggregate function takes a binary input relation, e.g., Total of Sales in each country. The aggregate functions take relations as input and return relations as an output. They are classified into Distributive, Algebraic and Holistic.

For example, the users of such a system typically wish to obtain information of much larger granularity than a single sale, e. g, The Stores' performance per month, irrespective of the individual product.

This would require as regards the relation in Table I aggregation of Total_Sales over the STORE and TIME dimensions. It can be expressed using the following SQL statement

| SELECT | Store, Time as (SUM) Sales |
|---|---|
| FROM | Sales |
| GROUP-BY | Store, Time | to give the result shown in Table II.

There are three disadvantages in the SQL/relational approach. The first is that many different aggregations are possible. In typical practical cases, the Sales relation of the above example may well have many more domains than shown in the example and each different aggregate requires a distinct SQL program. The second disadvantage is that it is by no means easy to visualise the computations conceptually. Finally, most users to-day expect to manipulate their data graphically.

Figure 2:
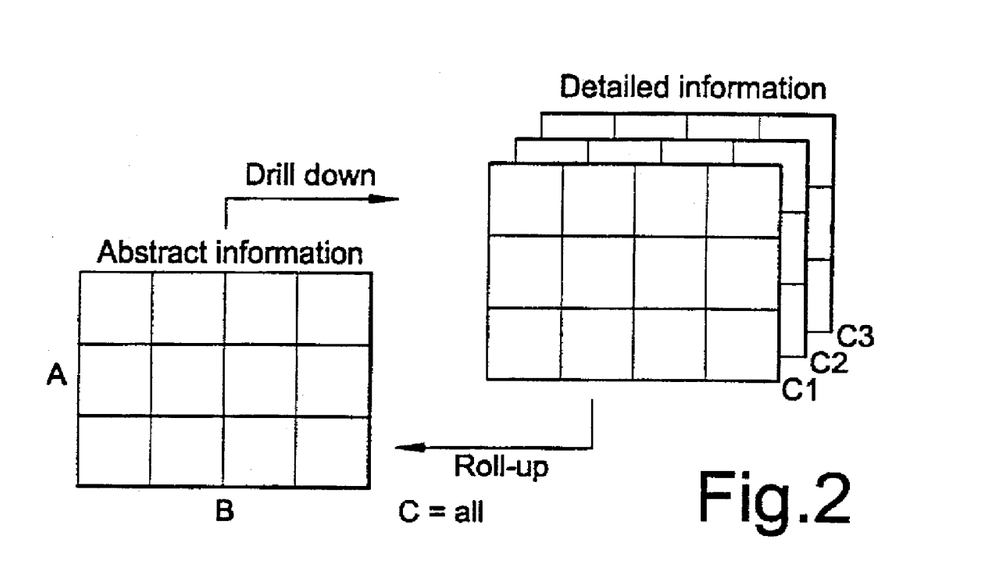
FIG. 2 shows the FIG. 1 cube from a different perspective and illustrates the effect of roll-up and drill-down operations.

The user interface to the Multidimensional data model (Cube) allows the user to specify the conceptual multidimensional operators graphically, for example as shown in FIG. 2.

Users in OLAP systems typically require to investigate many of the different possible aggregates. Given a measure of N dimensions there are $2^N$ possible aggregates (the above example with three dimensions giving rise to 8 aggregates). It is important that users can specify and visualize the different levels of aggregation with ease. Typically this would be done in real time using a graphical user interface operating with the Cube-by operator to explore the multidimensional environment. The Cube-by operator is the n-generalization of simple aggregate functions and it computes Group-bys corresponding to all possible combinations of a list of attributes.

With the introduction of the Cube-by operator it became easier for users to specify and visualize different levels of aggregation. However, the processing required to support this operator is enormous in terms of time and storage. Particularly where hierarchies are involved the effective number of possible combinations becomes unmanageable.

Many workers have attempted to approach the implementation of the Cube-by by directly implementing Materialized Views which are precomputed for later retrieval. This is because it has been judged that the computation of aggregates 'on the fly' (i.e., on demand) would be too slow. Though significant research has been carried out to optimize the Materialized View approach, the method is inherently unsatisfactory. First there are a large number of Views. This implies a long precomputation time and precludes even modest update. Storage of the Views requires storage capacity which is possibly more than an order of magnitude greater than that required for the original data.

For the highest aggregations, the pre-computation approach is economical in the additional storage resources consumed, while providing gratifyingly rapid response. The low-level aggregates however are large and numerous, resulting in a many-fold expansion of the original relation. They virtually always require further processing, e.g., restriction, etc., to extract the tuples of interest. The most significant disadvantage, however, of the pre-computational approach is that it is not suited to dealing with update, other than as a batch-type operation separate from its interactive use. While there are undoubtedly situations in which this is acceptable, it nevertheless represents a major restriction on the system performance envelope for this approach.

The major disadvantage of a purely direct computational approach (i.e., on the fly) is the work which must be undertaken for each operation, and hence the much greater delay given equivalent systems performance parameters.

A partial-computation approach is possible but has been a subject of research by many workers mainly because to select the materialized views is not trivial. Systems architecture has also been the subject of research to minimize the total query response and the cost of maintaining the selected views, given a limited amount of resources (time, storage).

The above mentioned approaches have their advantages and disadvantages.

BRIEF SUMMARY OF THE INVENTION

It is an object of the present invention to provide a new and improved database processor and system architecture.

The present invention is directed to a database processor and system architecture capable of operating as as On-line Analytical Processing (OLAP) system for the implementation of multidimensional aggregates of an input relation, and which is arranged to obtain such multidimensional aggregates after a pre-processing stage which identifies aggregates which can be obtained without computation, said pre-processing stage being arranged to:

i) identify and store the primary keys derived from the schema of the input relation;

ii) establish a Group-by schema generator to generate schemas from minimum arity to maximum arity of aggregate for the possible aggregates of the input relation;

iii) sequentially in an arity order beginning with single columns and proceeding in an order in which each lower level of every sub-tree is visited before any root (i.e., breadth-wise from the lowest level to the highest node of the lattice) comparing the generated schemas with the primary keys stored in step (i) augmented by any previous schema identified as being a key and in the event of a generated schema containing a stored key treating the input relation as the virtual representation of the corresponding Group-by aggregate without computation.

Preferably the arity order is the sequence minimum arity to maximum arity. Alternatively the arity order (known as 'post order') may be used in which all the sub-trees of each sub-tree are visited before the root of that sub-tree. This commences with a least some schemas of minimum arity followed by those higher arities which utilise schemas of the minimum arity which have already been dealt with, and so on. In any event the order ensures that those schemas of higher arity are dealt with subsequently to the sub-schemas of lower arity. Accordingly for a schema ABC the sub-schemas are A, B, C, AB, AC, BC and the order referred to may be A,B, C, AB, AC, BC or A, B, AB, C, AC, BC or B, C, BC, A, AB, AC, etc.

Preferably in accordance with the present invention, in sequence, each schema which is not found to contain a stored key according to step (iii) is subjected to a secondary check step, wherein an upper bound size of the Group-by relation defined by the current such schema is evaluated and the size of the input relation is compared against that upper bound size and in the event of the upper bound size not being less than the size of the input relation, sequentially comparing the tuples of the current schema and in the absence of tuple-duplication recognising that the current schema is a key and treating the input relation as the virtual representation of the corresponding Group-by aggregate without computation.

The upper bound size of the Group-by relation defined by the current schema may be evaluated according to a predetermined algorithm for example based upon the product of the cardinalities (i.e., number of distinct values in a column) of the relation. There are various other algorithms which may take into account previously-evaluated upper bound sizes.

Preferably those generated Group-by schemas which are recognised as being or as containing a key are effectively stored to permit subsequent retrieval of the corresponding Group-by aggregate without computation. The store may contain pointers to such schemas since such pointers in effect represent the schema.

It will be understood that, in accordance with Relational Theory, a Relation R, which is defined over Domains $\{d_1 \ldots d_n\}$, is composed of a set of tuples each of which has the same number and type of fields. (The complete tuple must be distinct for it to conform to the definition of any Relation as being a set of tuples). One domain (or combination of domains which is minimal in number) of a given relation has values which uniquely identify each element (n-tuple) of that relation. Such a domain (or combination) is called a primary key. In general there may be several primary keys. Primary Keys belong to two different categories: Definitional and Observational.

Observational Primary Keys are dimension domains, or a set of dimension domains that together possess the unique identification property for a relation within a particular dataset or instance of the database.

The unique identification property is invariant for an observational primary key in a read-only database, but may be destroyed by updates to the dataset. Thus an observational primary key is equivalent to a definitional primary key in a read-only database, or until an update to the relation occurs in the case of a transactional database.

Definitional Primary Keys are those observational keys which have been defined as part of the schema (e.g., by the database designer) and remain keys irrespective of allowed changes in the data set.

Figure 3:
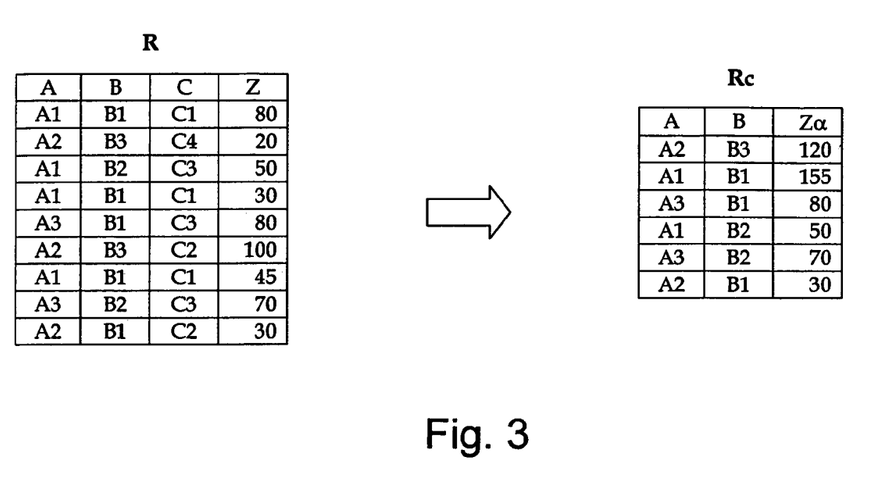
FIG. 3 illustrates a dataset R and the aggregation dataset $R_c$ produced by the SUM operator applied to R.

The present invention is founded upon the fact that where the result of an aggregate is equivalent to the input relation the aggregate does not require to be explicitly computed. For example, consider an Aggregation as any operation (applied to a parent relation R) that produces a result relation Rc which consists of a projection of the relation R over a subset of domains, while at the same time applying an operator (e.g., SUM) to the attribute defined as the Measure of Interest. Each tuple of the result relation Rc is either derived from a single tuple of R, or from the combination of two or more tuples of R which have the same dimensional values in the dimensions projected in Rc as shown in FIG. 3.

By virtue of the present invention the amount of aggregate computation and aggregate storage required in an OLAP system is significantly reduced.

Preferably and also independently, those Group-by schemas which require computational aggregation are computationally aggregated and each aggregate is assessed to identify whether or not it is similar to the parent relation by having almost the same cardinality (i.e., number of tuples) as the input relation, in which case to reduce storage space only those tuples that differ from the input relation need to be represented, whereby the aggregate can be obtained from this representation of the difference and from the input relation.

It will be understood in the context of database processors that items may be represented by explicit storage of the item or by various other known techniques which enable the item to be realised.

As a result of the present invention and the preferred embodiments thereof the database processor and system architecture can effectively represent a significant percentage (typically greater than 50%) of the aggregates, as though everything had been computed, the storage of these representations being within the original database and even if the remainder of the aggregates are actually computed and stored these are within a small percentage of the space required by the conventional materialised views process, and the amount of processing is greatly reduced. Typically over different datasets savings of the order of 50% in space and time can be achieved.

BRIEF DESCRIPTION OF THE SEVERAL VIEWS OF THE DRAWINGS

Embodiments of the present invention will now be described by way of example with reference to the accompanying drawings in which.

DETAILED DESCRIPTION OF THE INVENTION

Figure 4:
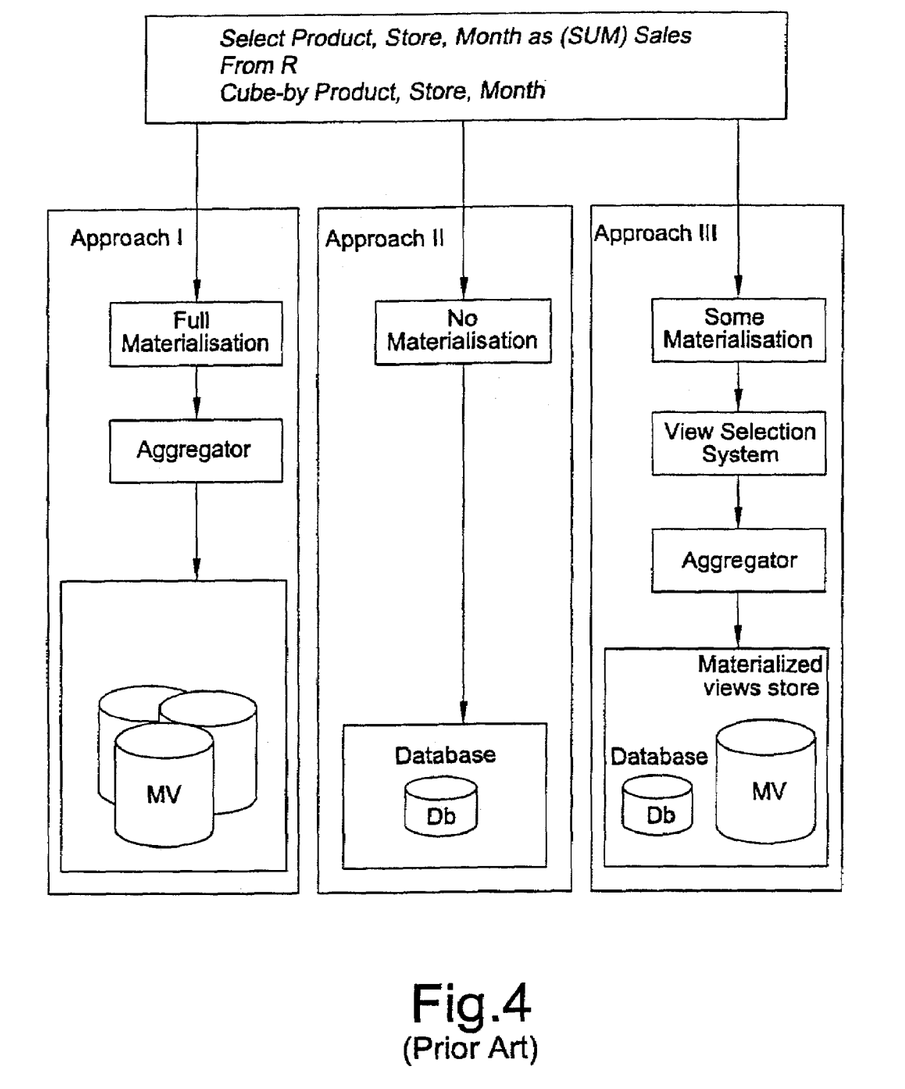
FIGS. 4 and 5 together illustrate three alternative known pre-processing stages for use with three known querying stages together forming three known OLAP systems.
Figure 5:
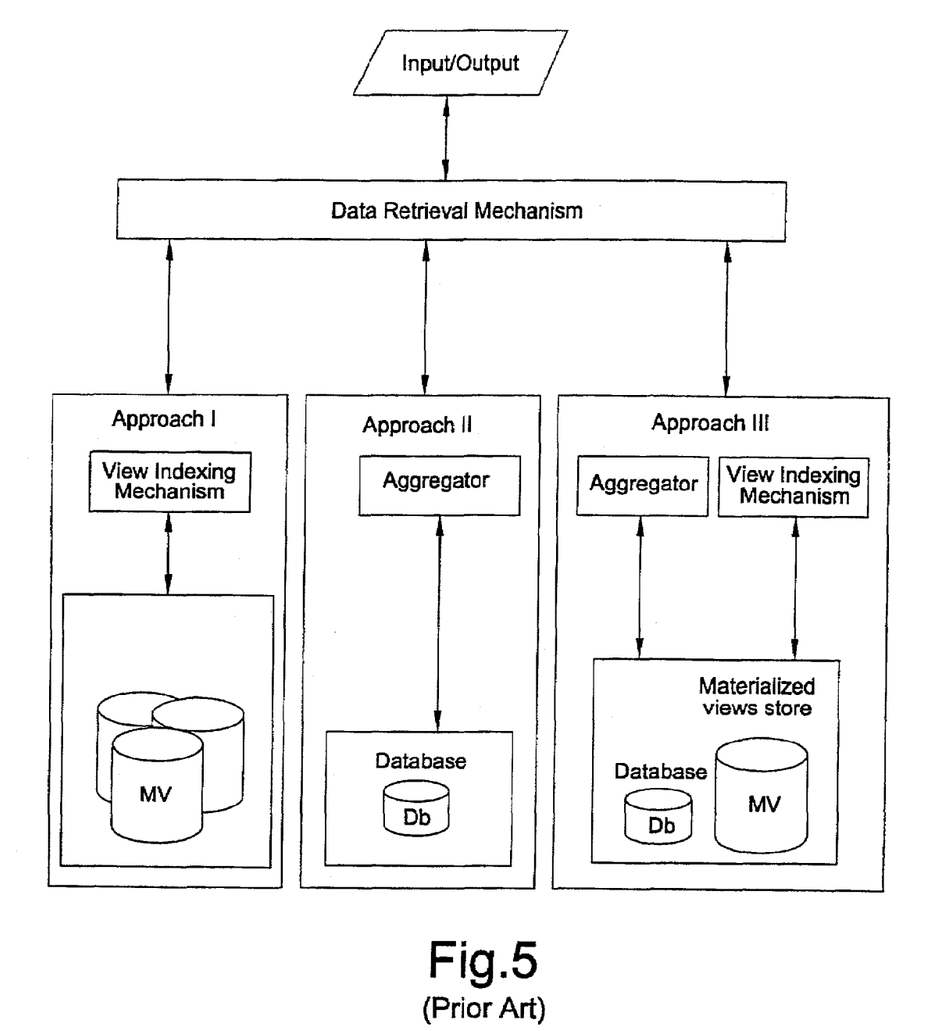

By way of comparison with the present invention conventional OLAP systems are shown in FIGS. 4 and 5. The earliest conventional system (Approach II) has no materialisation but uses the data retrieval mechanism which directly calls the aggregator to compute on the fly the necessary aggregation which is then returned as a result. The only storage is that required by the database (DB).

Approach I has full materialization and the system precomputes all possible aggregates in advance. These are stored as materialized views in an additional materialized view (MV) store for later querying and requires use of an indexing mechanism. Unfortunately the MV storage required is excessive, the process requires a great deal of data manipulation which takes a considerable time and consequently is limited to systems requiring only moderate updates.

Approach III is a compromise between the first two in that the system selects in advance a sub-set of the possible aggregates and these are computed and stored as materialized views in an Mv store which is additional to the DB store. When a query has to be handled the system first checks whether the required result is already stored as a materialized view. Failing which, the aggregator is activated to compute the required result directly. This system results in a considerable saving in MV storage required for the materialized views but is achieved at the cost of a much higher variance in the time required to obtain a result.

Figure 6:
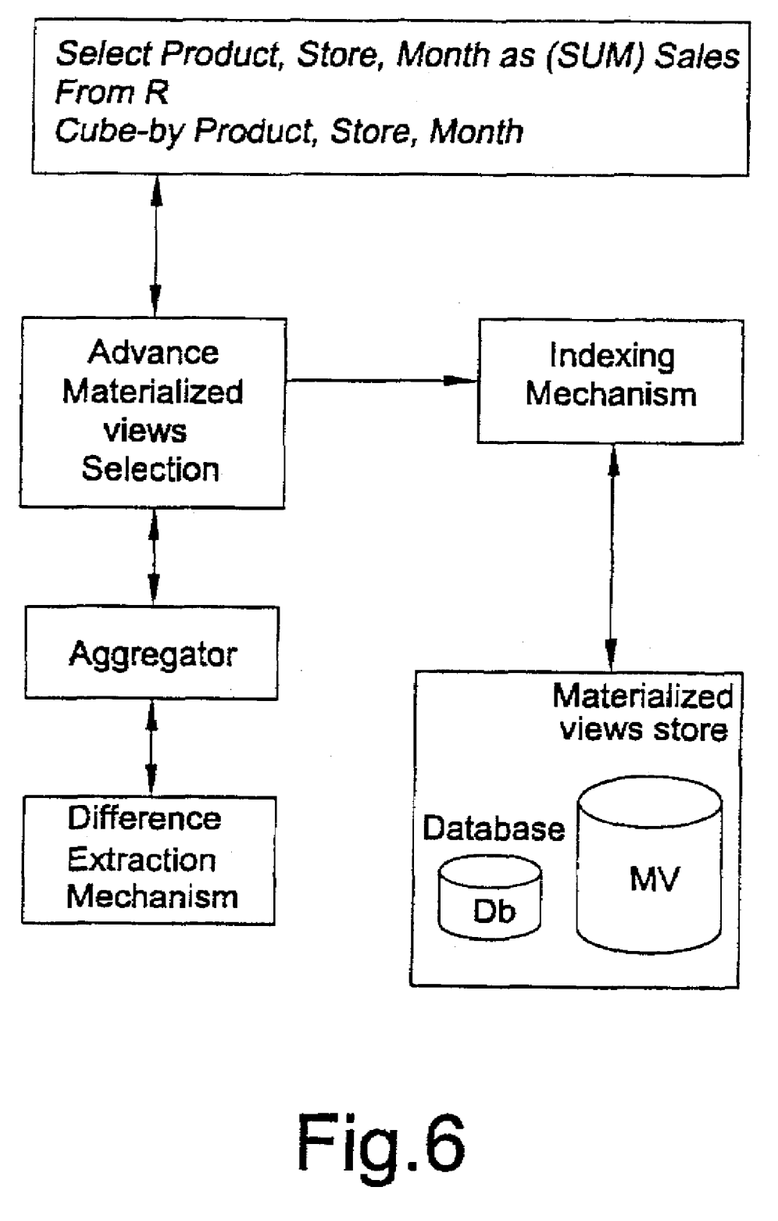
FIGS. 6 and 7 illustrate the pre-processing and the querying stages of an OLAP system in accordance with the present invention.
Figure 7:
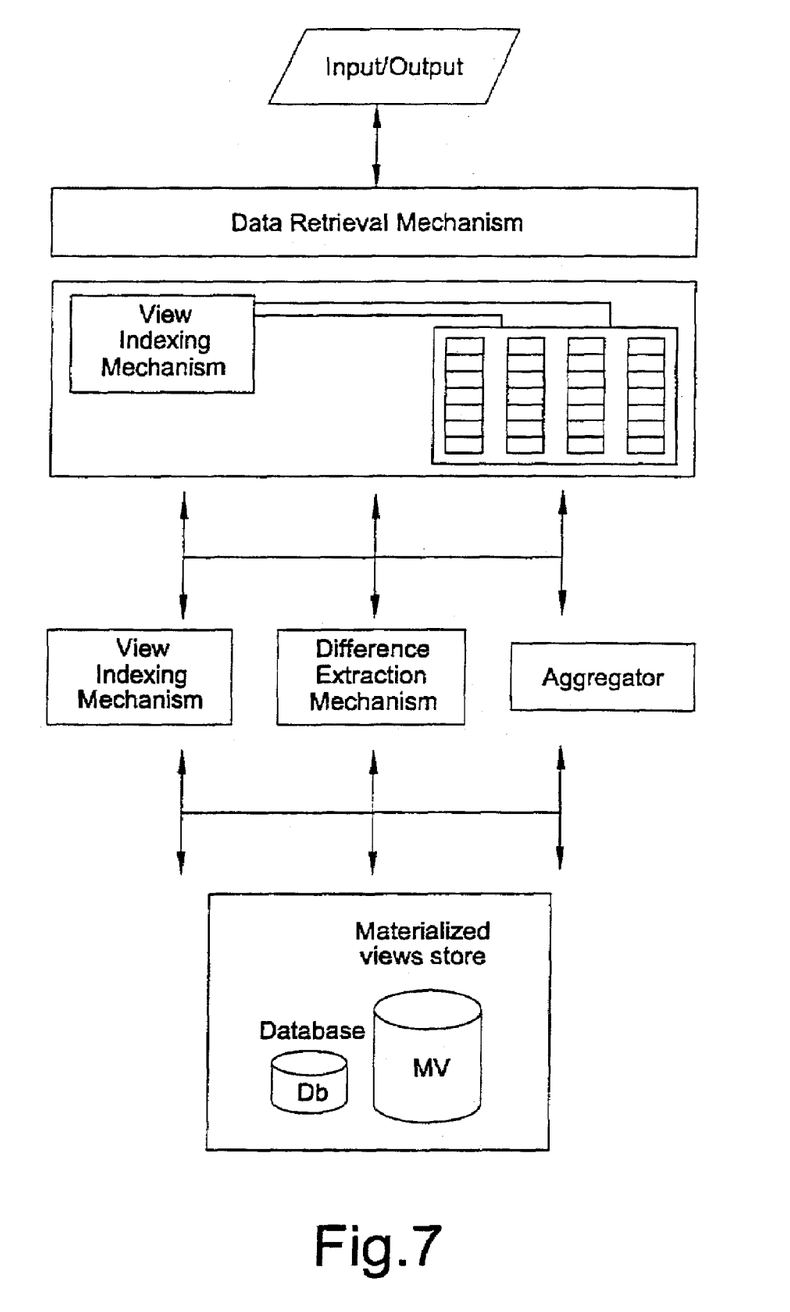

The system in accordance with the present invention is shown in block diagram form in FIGS. 6 and 7. Like the conventional system (Approach III) employing stored materialised views, the system of FIGS. 6 and 7 also has a pre-processing stage. However, the operation of the system in the pre-processing stage is entirely different in that those aggregates which do not require to be computed are identified so that they can be retrieved from the input relation stored in the data base, whilst those aggregates which do require to be computed are computed and stored as materialised views, or if the aggregate is sufficiently similar to the parent relation the aggregate is stored in a difference format with a pointer to the parent relation. This is schematically shown in FIGS. 8A, 8B, 9 and 10.

Figure 8A:
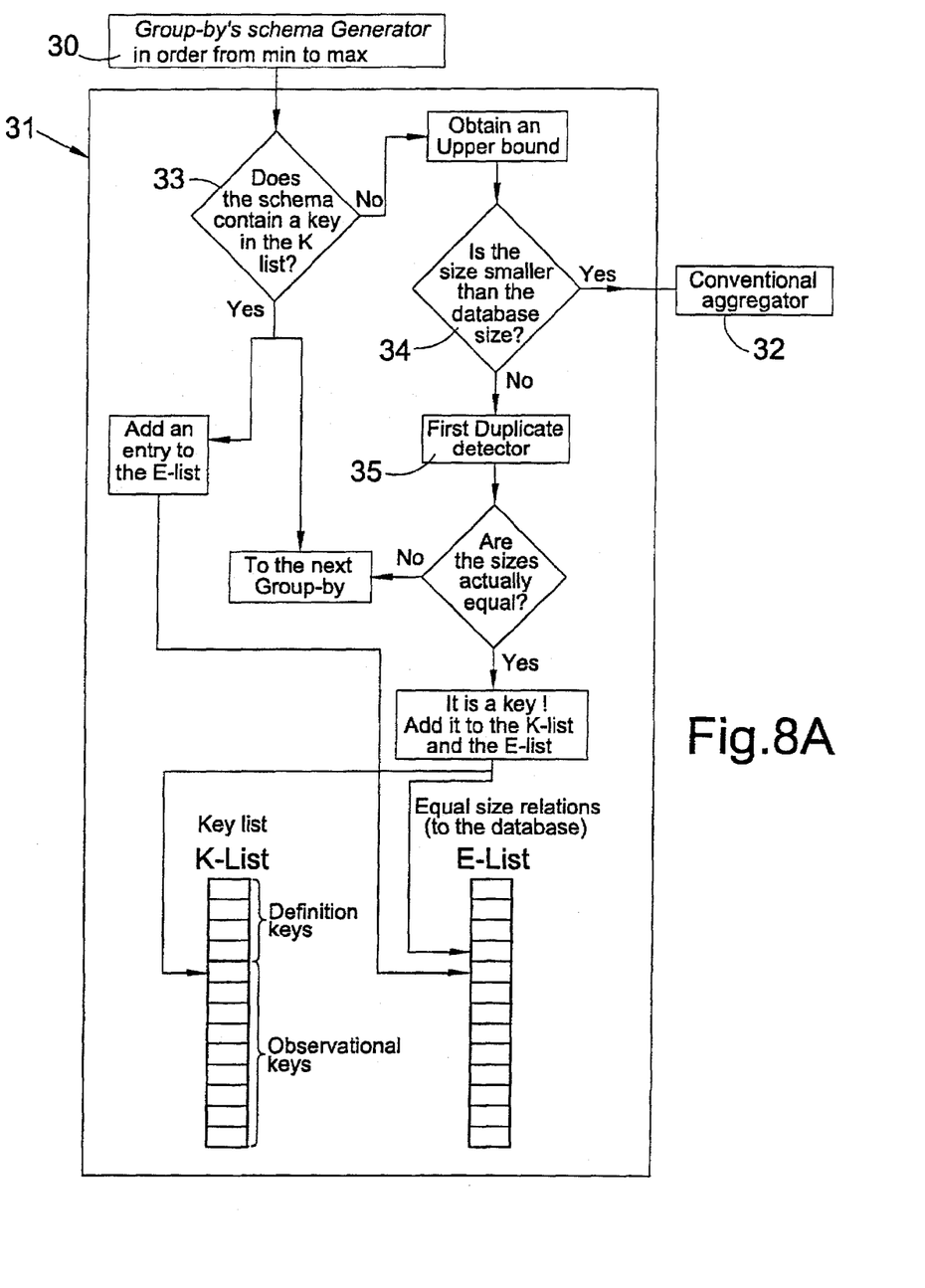
FIGS. 8A, 8B, 9 and 10 identify detailed methods used in the system of FIGS. 6 and 7.

As shown in FIG. 8A a Group-by schema generator 30 issues schemas in sequence in an arity order which is essentially from minimum arity to maximum arity of aggregate for the possible aggregates of the input relation to an advance Materialised views selector 31 which operates to categorise the schemas into lists K and/or E failing which the schemas are directed to an aggregator 32 to compute aggregations. The K list initially stores any primary keys derived from the schema of the input relation and is subsequentially loaded with observational keys from the Group-by schemas identified by the categorisation process. The E list stores all Group-by schemas which contain a key previously stored in the K-list or which are found to be a key and from which the corresponding aggregate can be obtained without computation.

In the first pass the generator 30 for the required Group-by schemas issues these sequentially to a check unit 33 which examines the schema of the Group-by and checks its domains against the key list K to determine whether or not the schema contains a stored K-list key. At this point the K list contains all of the primary keys derived from the input relation augmented by any previous Group-by schema identified as being a key. Any Group-by schema which contains a key of the parent relation has a corresponding aggregate which can be represented by the parent relation itself and hence that aggregate does not require to be computed and stored, instead the schema is inserted directly into the E list.

Alternatively, if there is no match according to unit 33 the Group-by schema is subjected to a secondary check to identify if the schema is itself a key and which is based on size estimation in check unit 34. On receipt of a schema unit 34 evaluates an upper bound size (ES) of the Group-by relation defined by that schema and then compares that evaluation with the size of the input relation. If the current upper bound size is not less than the input relation size then the individual tuples as defined by the current schema are sequentially compared by unit 35, each succeeding tuple being compared with all its predecessors which are stored in unit 35 and provided a duplicate tuple is not detected (i.e., duplication is absent) the process continues until all the tuples have been compared. If at this stage no duplication has been detected the schema is recognised as being a key and is added to both the K and E lists provided that on a further check of these tuples the total size is found to be the same as that of ES.

The E list, as a result, contains (pointers to) all aggregations which are equal in size to their parent and which hence neither require to be computed explicitly nor stored. The K list contains the primary keys derived from the schema of the input relation augmented by any Group-by schema identified as itself being a key.

Group-by schemas which are not entered into the E list are directed to the aggregator 32 for aggregation on a computational basis. Aggregator 32 may operate on the conventional basis. Alternatively aggregator 32 may operate on a modified basis to reduce the storage space required for computed aggregates, as shown in FIG. 8B.

Figure 8B:
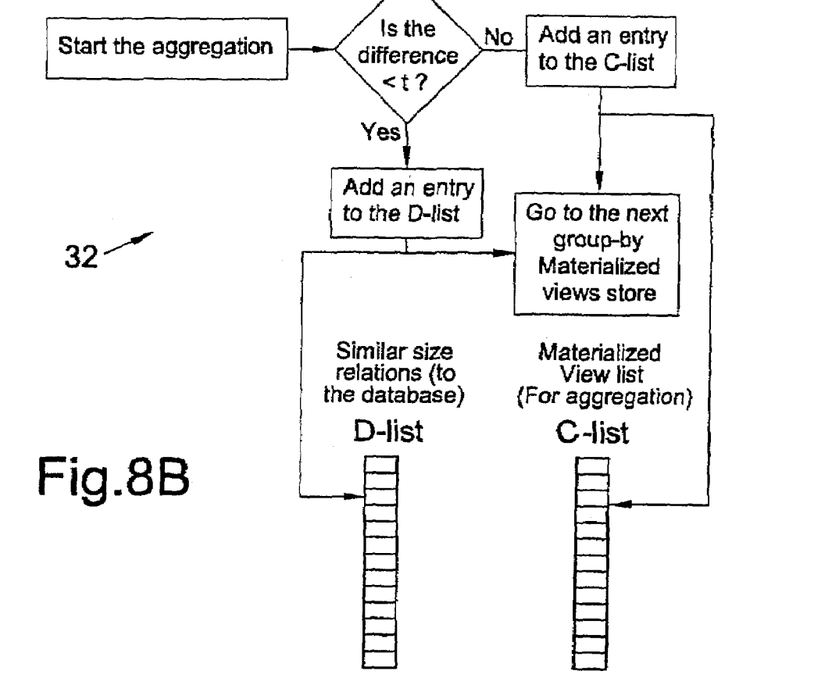

The aggregator 32 of FIG. 8B computes the aggregates and then categorises each aggregate according to size in comparison with the size of the parent relation.

If the size is less than that of the parent but within a specified threshold distance (t) of it the aggregator 32 stores this aggregate in a D-list difference format. This is made up of two parts, a small aggregate relation the tuples of which are each aggregates of more than one tuple of the parent, and a pointer to the parent relation. The appropriate entry specifying the relation and the small aggregate relation as well as the schema of the aggregate are inserted into the D list.

We define a relation R' to be similar to the relation R if a number $n'_R$ of equivalent tuples in R' is within a threshold $t_s$ of the number of the corresponding tuples $n_R$ in R.

$$\frac{n'_R}{n_R} < t_s < 1$$

The value of $t_s$ may be pre-determined or may be varied since its size influences the required storage volume and the retrieval time of an aggregate.

If the difference is larger than t then the aggregate, or at least a pointer to it, is entered into a C-list which contains pointers to all aggregates which have been conventionally computed and stored in a materialised views (MV) store.

Figure 9:
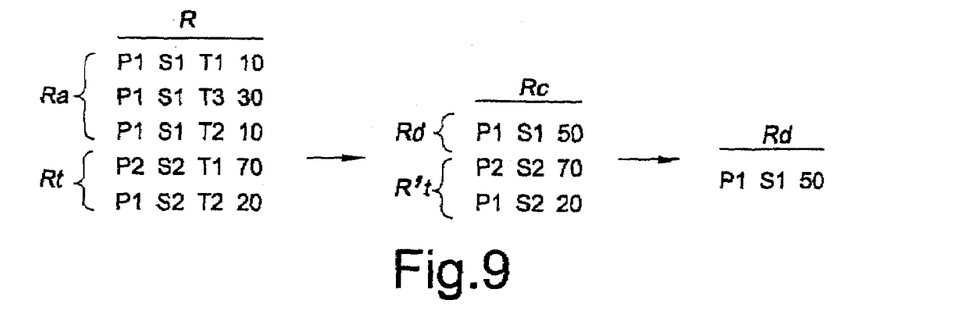

With regard to the difference production procedure utilized in FIG 8B consider by way of example the relation R (p,s,t) shown in FIG 9 aggregated to the relation Rc (p,s). As can be seen two $(R'_t)$ tuples (P2, S2, 70) and (P1, S2, 20) are equivalent to the corresponding tuples $(R_t)$ in R (P2, S2, T1, 70) and (P1, S2, T2, 20) respectively. The remaining tuple $(R_d)$ is different being an aggregate of three tuples $(R_a)$ in R. The two relations R and Rc are represented indirectly by storing only the parent relation R and Rd where Rd consists of the tuples of Rc which are not equivalent to any in the parent relation R.

The algorithm required for this process requires the following operations:

$$R'_t = R_c \, \alpha \, R$$

$$R_d = R_c - R'_t$$

where:
(α) is the semi-join relational operation, and
(−) is the difference operator.

Figure 10:
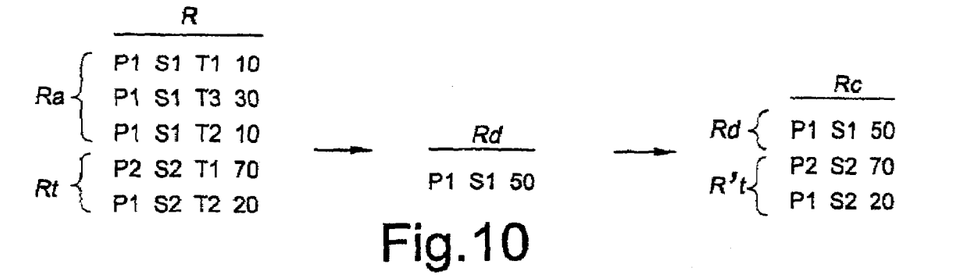

When a query is received the system of FIG. 7 may require to obtain those aggregates which are stored in the D-list format of FIG. 8B and this is achieved as shown in FIG. 10 using the stored relation $R_d$ in the following operations;

$$R'_t = \pi_{pls}(\overline{R\alpha R_d})$$

$$R_c = R_d \cup R'_t$$

where $(\overline{R\alpha R_d})$ is the anti-semijoin operation and $(\cup)$ is the union operator.

As will be readily understood by an expert in the field, the implementation of this algorithm can be rendered faster if an explicit representation (such as a bit list) of the set of tuples being selected from the parent relation (readily computed during the aggregation pre-processing phase) is stored in association with the two component part relations.

Otherwise the FIG. 7 system obtains the required aggregate by using the content of the C-list as a pointer to the previously computed and stored aggregate or alternatively via the E-list which stores the schemas of those aggregates which do not require computation but which are to be found from the input relation which is already stored in the original database.

TABLE I

SALES

| Product | Store | Time | Total Sales |
| --- | --- | --- | --- |
| P1 | S1 | Jan | 50 |
| P1 | S1 | Feb | 34 |
| P1 | S2 | March | 22 |
| P2 | S3 | Jan | 8 |
| P2 | S3 | Jan | 96 |
| P2 | S1 | Jan | 56 |
| P2 | S1 | Apr | 45 |
| P3 | S2 | Feb | 98 |
| P3 | S2 | Jan | 33 |

TABLE II

| Store | Time | Total Sales |
| --- | --- | --- |
| S1 | Jan | 106 |
| S1 | Feb | 34 |
| S2 | March | 22 |
| S3 | Jan | 104 |
| S1 | Apr | 45 |
| S2 | Feb | 98 |
| S2 | Jan | 33 |

What is claimed is:

1. A database processor and system architecture capable of operating as an On-line Analytical Processing (OLAP) system for the implementation of multidimensional aggregates of an input relation, and which is arranged to obtain such multidimensional aggregates after a preprocessing stage which identifies aggregates which can be obtained without computation, said pro-processing stage being arranged to:
   i) prior to obtaining multidimensional aggregates, in the preprocessing stage, identify and store the primary keys derived from the schema of the input relation;
   ii) establish a Group-by schema generator to generate schemas from minimum arity to maximum arity of aggregate for the possible aggregates of the input relation;
   iii) sequentially in an arity order beginning with single columns and proceeding in an order in which each lower level of every sub-tree is visited before any root comparing the generated schemas with the primary keys stored in step (i) augmented by any previous schema identified as being a key and in the event of a generated schema containing a stored key treating the input relation as the virtual representation of the corresponding Group-by aggregate, such that the Group-by aggregate is identified as capable of being obtained without computation.

2. A database processor as claimed in claim 1, wherein the arity order is the sequence minimum arity to maximum arity.

3. A database processor as claimed in claim 1, where in sequence, each schema which is not found to contain a stored key according to step (iii) is subjected to a secondary check step, wherein an upper bound size of the Group-by relation defined by the current such schema is evaluated and the size of the input relation is compared against that upper bound size and in the event of the upper bound size not being less than the size of the input relation sequentially comparing the tuples of the current schema, and in the absence of tuple-duplication recognizing that the current schema is a key and treating the input relation as the virtual representation of the corresponding Group-by aggregate without computation.

4. A database processor as claimed in claim 3, wherein the upper bound size of the Group-by relation defined by the current schema is evaluated according to a predetermined algorithm.

5. A database processor as claimed in claim 1, wherein those generated Group-by schemas which are recognized as being or as containing a key are effectively stored to permit subsequent retrieval of the corresponding Group-by aggregate without computation.

6. A database processor as claimed in claim 5, wherein the store contains pointers to those generated Group-by schemas which are recognized as being or as containing a key, such pointers in effect representing the schema.

7. A database processor as claimed in claim 1, wherein those Group-by schemas which require computational aggregation are computationally aggregated and each aggregate is assessed to identify whether or not it is similar to the parent relation by having almost the same cardinality as the input relation, in which case to reduce storage space only, those tuples that differ from the input relation need to be represented, whereby the aggregate can be obtained from this representation of the difference and from the input relation.

8. An on-line analytical processing system comprising a database processor and system architecture as claimed in claim 1.

9. A database processor and system architecture capable of operating as an On-line Analytical Processing (CLAP) system for the implementation of multidimensional aggregates of an input relation, and which is arranged to obtain such multidimensional aggregates after a preprocessing stage which identifies aggregates which can be obtained without computation, said pre-proces sing stage being arranged to:
   i) prior to obtaining multidimensional aggregates, in the preprocessing stage, identify and store the primary keys derived from the schema of the input relation; and
   ii) establish a Group-by schema generator to generate schemes from minimum arity to maximum arity of aggregate for the possible aggregates of the input relation, wherein those Group-by schemas which require computational aggregation are computationally aggregated and each aggregate is assessed to identify whether or not it is similar to the parent relation by having almost the same cardinality as the input relation, in which case to reduce storage space only those tuples that differ from the input relation need to be represented, wherein aggregates that can be obtained from this representation of the difference and from the input relation are identified as aggregates that are capable of being obtained without computation.

* * * * *

UNITED STATES PATENT AND TRADEMARK OFFICE
CERTIFICATE OF CORRECTION

PATENT NO. : 6,996,554 B2
APPLICATION NO. : 10/121502
DATED : February 7, 2006
INVENTOR(S) : Kotsis et al.

It is certified that error appears in the above-identified patent and that said Letters Patent is hereby corrected as shown below:

Column 9,
Line 59, "pro-processing" should read --pre-processing--.

Column 10,
Line 54, "(CLAP)" should read --(OLAP)--;
Line 59, "pre-proces sing" should read --preprocessing--;
Line 65, "schemes" should read --schemas--.

Signed and Sealed this

Eighteenth Day of July, 2006

JON W. DUDAS
*Director of the United States Patent and Trademark Office*